US009246922B2

(12) United States Patent
Lewis et al.

(10) Patent No.: US 9,246,922 B2
(45) Date of Patent: *Jan. 26, 2016

(54) PROGRAMMATICALLY ENABLING USER ACCESS TO CRM SECURED FIELD INSTANCES BASED ON SECURED FIELD INSTANCE SETTINGS

(71) Applicant: Microsoft Technology Licensing, LLC, Redmond, WA (US)

(72) Inventors: Elliot Lewis, Bellevue, WA (US); Andriy Smertin, Bellevue, WA (US); Noor Mohammed Merchant, Sammamish, WA (US); Mahesh Hariharan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,491

(22) Filed: Jun. 26, 2014

(65) Prior Publication Data
US 2014/0325607 A1    Oct. 30, 2014

Related U.S. Application Data

(63) Continuation of application No. 13/010,587, filed on Jan. 20, 2011, now Pat. No. 8,805,882.

(51) Int. Cl.
*G06F 17/30* (2006.01)
*H04L 29/06* (2006.01)
(Continued)

(52) U.S. Cl.
CPC ............... *H04L 63/10* (2013.01); *G06F 15/16* (2013.01); *G06F 17/30* (2013.01);
(Continued)

(58) Field of Classification Search
CPC .......... G06F 11/1056; G06F 17/30188; G06F 2221/2141; G06F 2221/2113; G06F 2221/2145; G06F 12/1491; G06F 17/30893; G06F 17/30902; G06Q 30/01; G06Q 10/103; G06Q 10/06; G06Q 30/02; H04L 67/306; H04L 63/10; H04L 63/105; H04L 63/107; H04L 63/20
See application file for complete search history.

(56) References Cited

U.S. PATENT DOCUMENTS 6,253,203 B1   6/2001  O'Flaherty et al.
6,732,181 B2   5/2004  Lim et al.
(Continued)

FOREIGN PATENT DOCUMENTS

WO         9904347 A2        1/1999
WO      WO 02/06934    *    1/2002
(Continued)

OTHER PUBLICATIONS

"Field Level Security in CRM 2011", Retrieved at << http://inogic.blogspot.com/2010/10/field-level-security-in-crm-2011.html >>, Oct. 26, 2010, pp. 5.
(Continued)

*Primary Examiner* — Srirama Channavajjala
(74) *Attorney, Agent, or Firm* — Thomas Marquis; Jim Ross; Micky Minhas

(57) ABSTRACT

Access to customer relationship management (CRM) secured field instances is enabled based on field settings. A requester's identity determines action paths to be executed in order to enable access to fields. A client application's user privileges are inherited to enable access to secured fields. Such access through a granted privilege is provided through an API intermediating inheritance of user's privileges from client application.

18 Claims, 6 Drawing Sheets

(51) Int. Cl.
*G06F 21/62* (2013.01)
*G06Q 30/00* (2012.01)
*G06F 15/16* (2006.01)
*G06Q 10/00* (2012.01)

(52) U.S. Cl.
CPC ........... *G06F 21/6218* (2013.01); *G06Q 10/00* (2013.01); *G06Q 30/00* (2013.01); *G06Q 30/01* (2013.01); *H04L 63/101* (2013.01); *H04L 63/105* (2013.01); *H04L 63/107* (2013.01); *H04L 63/20* (2013.01)

(56) References Cited

U.S. PATENT DOCUMENTS

| | | |
|---|---|---|
| 6,915,270 B1 | 7/2005 | Young et al. |
| 7,124,192 B2 | 10/2006 | High et al. |
| 7,599,934 B2 | 10/2009 | Conlan et al. |
| 8,150,728 B1 | 4/2012 | Bayer et al. |
| 8,612,590 B1 | 12/2013 | Chaddha et al. |
| 8,805,882 B2 * | 8/2014 | Lewis et al. ................. 707/783 |
| 2002/0133392 A1 | 9/2002 | Angel et al. |
| 2002/0140731 A1 | 10/2002 | Subramaniam et al. |
| 2002/0178271 A1 * | 11/2002 | Graham et al. .............. 709/229 |
| 2003/0078882 A1 * | 4/2003 | Sukeda ............... G06Q 20/06 705/39 |
| 2003/0117434 A1 * | 6/2003 | Hugh ................ G06F 17/3056 715/744 |
| 2003/0212654 A1 | 11/2003 | Harper et al. |
| 2004/0006506 A1 | 1/2004 | Hoang |
| 2004/0088300 A1 | 5/2004 | Avery et al. |
| 2004/0133587 A1 * | 7/2004 | Matsumoto ............ G06Q 30/02 |
| 2004/0172550 A1 * | 9/2004 | Sai ......................... G06F 21/62 713/193 |
| 2005/0091156 A1 | 4/2005 | Hailwood et al. |
| 2005/0289342 A1 | 12/2005 | Needham et al. |
| 2006/0136479 A1 * | 6/2006 | Fan et al. .................... 707/102 |
| 2006/0200860 A1 * | 9/2006 | Taylor et al. ................. 726/21 |
| 2006/0242175 A1 | 10/2006 | Tsyganskiy et al. |
| 2007/0156700 A1 * | 7/2007 | Becker ........................ 707/10 |
| 2007/0165818 A1 * | 7/2007 | Savoor ............... H04M 3/5158 379/201.12 |
| 2007/0239467 A1 * | 10/2007 | Bezeau et al. ................... 705/1 |
| 2007/0240106 A1 | 10/2007 | Manson et al. |
| 2008/0091774 A1 * | 4/2008 | Taylor et al. ................. 709/203 |
| 2008/0263462 A1 | 10/2008 | Mayer-Ullmann et al. |
| 2008/0270451 A1 | 10/2008 | Thomsen et al. |
| 2009/0070744 A1 | 3/2009 | Taylor et al. |
| 2009/0144804 A1 * | 6/2009 | Idicula ................ G06F 21/6218 726/2 |
| 2009/0286554 A1 | 11/2009 | Weinroth |
| 2009/0307275 A1 * | 12/2009 | Miyashita ............ G06F 12/1416 |
| 2010/0169159 A1 * | 7/2010 | Rose ..................... G06Q 30/02 705/7.29 |
| 2010/0179860 A1 | 7/2010 | Noel et al. |
| 2011/0072018 A1 * | 3/2011 | Walls et al. ................... 707/737 |
| 2011/0145292 A1 * | 6/2011 | Lillie et al. ................... 707/784 |

FOREIGN PATENT DOCUMENTS

| | | |
|---|---|---|
| WO | 03015342 A1 | 2/2003 |
| WO | WO 03/015342 * | 2/2003 |
| WO | WO 2006/047497 * | 5/2006 |
| WO | 2007084735 A2 | 7/2007 |
| WO | WO 2007/084735 * | 7/2007 |
| WO | 2008087447 A1 | 7/2008 |

OTHER PUBLICATIONS

"Result on Demand—a CRM 2011 (aka CRM 5.0) Blog", Retrieved at << http://www.resultondemand.com/blog/post/1ebfbc97-3643-4556-867d-4fef032183d9.aspx >>, Sep. 2010, pp. 2.

Rask, et al., "Implementing Row- and Cell-Level Security in Classified Databases Using SQL Server 2005", Retrieved at << http://technet.microsoft.com/hi-in/library/cc966395%28en-us%29.aspx >>, Apr. 1, 2005, pp. 28.

"Role-based Security Administration", Retrieved at << http://www.zoho.com/crm/role-based-security.html >>, Retrieved Date: Nov. 22, 2010, pp. 3.

"Security Tips for Apex and Visualforce Developers", Retrieved at << http://wiki.developerforce.com/index.php/Apex_and_Visualforce_Security_Tips >>, Retrieved Date: Nov. 22, 2010, pp. 5.

"People CRM Data Sharing Rules", Retrieved at << http://www.peoplecrm.com/default.php?do=Data_Sharing_Rules >>, Retrieved Date: Nov. 22, 2010, p. 1.

C.F. Cheung et al., "A multi-perspective knowledge-based system for customer service management", Expert Systems with Applications 24 (2003), pp. 457-470.

Anil L. Pereira et al., "Role-Based Access Control for Grid Database Services using the Community Authorization Service", IEEE Transactions on Dependable and Secure Computing, vol. 3, No. 2. Apr.-Jun. 2006, pp. 156-166.

Che-Wei Chang et al., "Using Analytic Hierarchy Process Evaluating Collaborative Customer Relationship Management System", 2009, IEEE, 4 pages.

* cited by examiner

PROGRAMMATICALLY ENABLING USER ACCESS TO CRM SECURED FIELD INSTANCES BASED ON SECURED FIELD INSTANCE SETTINGS

RELATED APPLICATIONS

This application is a continuation of U.S. Pat. No. 8,805,882 filed on Jan. 20, 2011 by the same inventors, commonly assigned herewith.

BACKGROUND

Customer Relationship Management (CRM) solutions provide tools and capabilities needed to create and maintain a clear picture of customers, from first contact through purchase and post-sales. For complex organizations, a CRM system may provide features and capabilities to help improve the way sales, marketing, and/or customer service organizations target new customers, manage marketing campaigns, and drive sales activities. CRM systems may include many components, hardware and software, utilized individually or in a shared manner by users internal or external to the organization.

Access to CRM records may be limited by CRM system's restrictive access settings. Client applications requesting access to CRM records may be limited by CRM system configuration and service complexities such as stored private information, user roles, and organizational restrictions. Protection of secured records containing private information may override client application access needs. Organizational policies may limit user privileges on client-side deployments limiting access to CRM services. Client deployments may lack sufficient security policies necessary to establish secured communications with CRM services running off site.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to programmatically enabling a user to access customer relation management (CRM) secured field instances based on secured field instance settings. According to some embodiments, a CRM application may determine an identity of a user requesting a record. The CRM application may determine an action path to user access based on secured field settings on the record. The application may enable the user to access the field by executing the action path.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
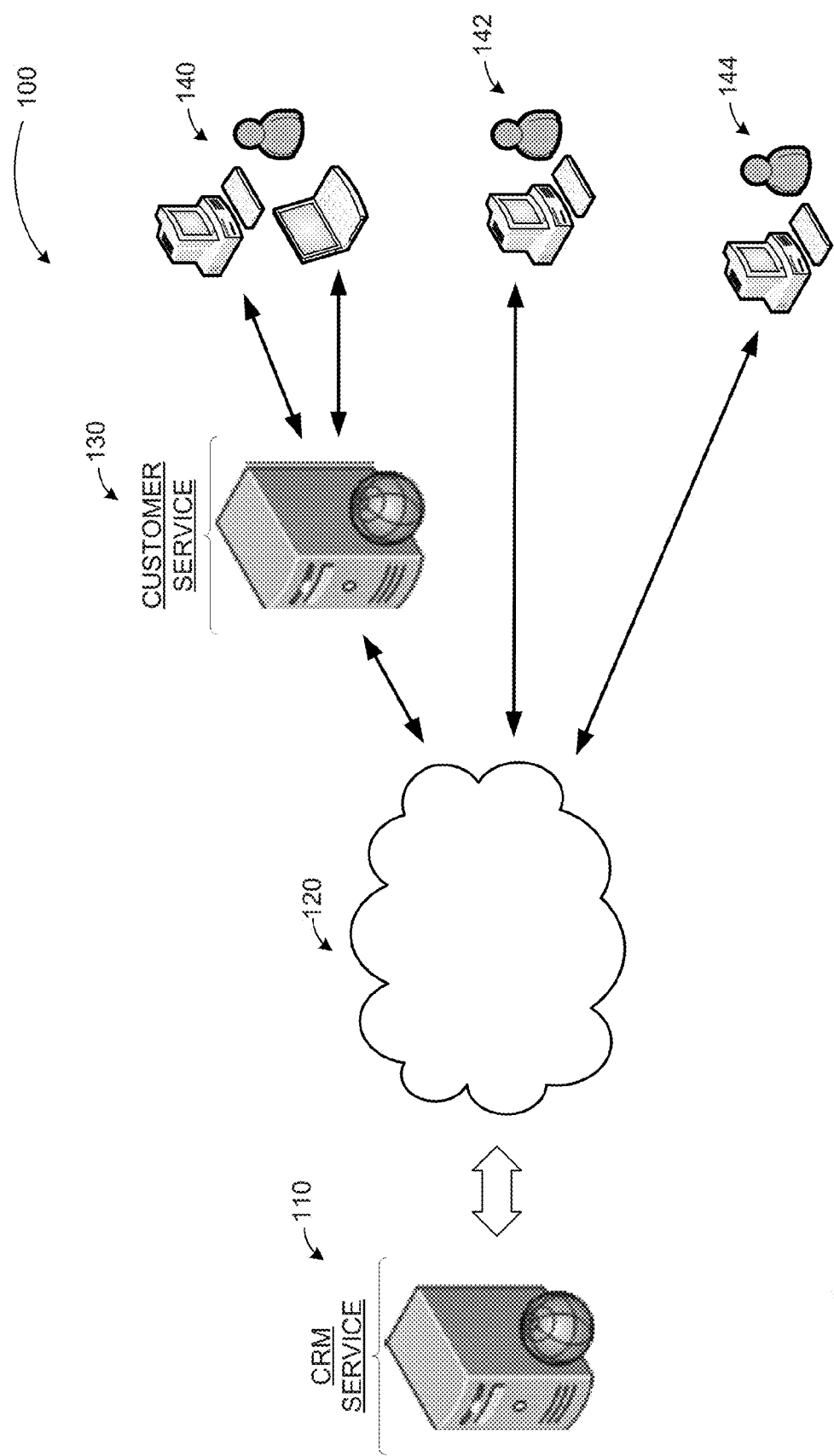
FIG. 1 is a diagram illustrating example components of customer relation management (CRM) service system.

As briefly described above, user access to customer relation management (CRM) secured fields for record instances that he have access to may be programmatically enabled based on secured field instance setting. According to some embodiments, a CRM application may determine the identity of a user requesting a record. The requesting user may not have access to certain records due to security roles but may be granted access through sharing of those records and may not have access to certain secured fields on a record, but can be granted access through sharing of specific fields on specific records. The CRM application according to embodiments may determine whether the user has global access to a secured field instance. Upon determining user's access level, the CRM application may select an action path based on field settings. The application may enable the user to access the secured field instance by executing the path. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for providing CRM services and data or similar environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of customer relation management (CRM) application system. In diagram 100, the servers 110 may execute one or more CRM applications and provide secured or unsecured records to users, among other information, via network 120. The network 120 may be a local network or may be an external entity such as an internet based infrastructure. It may provide wired or wireless connectivity. Network nodes may connect to each other through unsecured or secured connectivity. An example of a secured connectivity may be a Virtual Private Network (VPN) established among the network nodes with the use of encrypted communications.

The servers 110 may be associated with a CRM application communicating with the clients through a variety of protocols, an example of which may be the Hyper Text Transport Protocol (HTTP). The CRM application may also provide services to accommodate organization specific customer service applications to provide content to users. An example of such services may be providing secured fields data such as credit card numbers and unsecured fields data such as client contact information. Additionally, a CRM application may enable a user to access services through multiple client devices (e.g. client 140) or multiple users to access the same service simultaneously (e.g. clients 142, 144).

In an embodiment, the server 130 may provide customer service by hosting one or customer service applications. The customer service applications may provide CRM secured fields to client applications. An example of such services may be an inventory system. Other examples may include general information services such as sales, marketing reports, and comparable ones. Yet other examples may include personnel information transmitted through secured communications via encryption (or similar methods) such as patient health records, customer payment records, etc. Role-based security allows users to see a specific entity type, the record-based security allows users to see individual records, and finally field-level security allows users to see specific fields.

In an example scenario, a requester such as a customer service server or a user may request access to record fields on a CRM application running on a CRM server. The CRM application may determine the identity of the requester and determine the requester's access level status. Upon the determination, the CRM application may select an action path based on the settings of the CRM field instance. And, the application may enable the requester to access the requested field by executing the action path.

Figure 2:
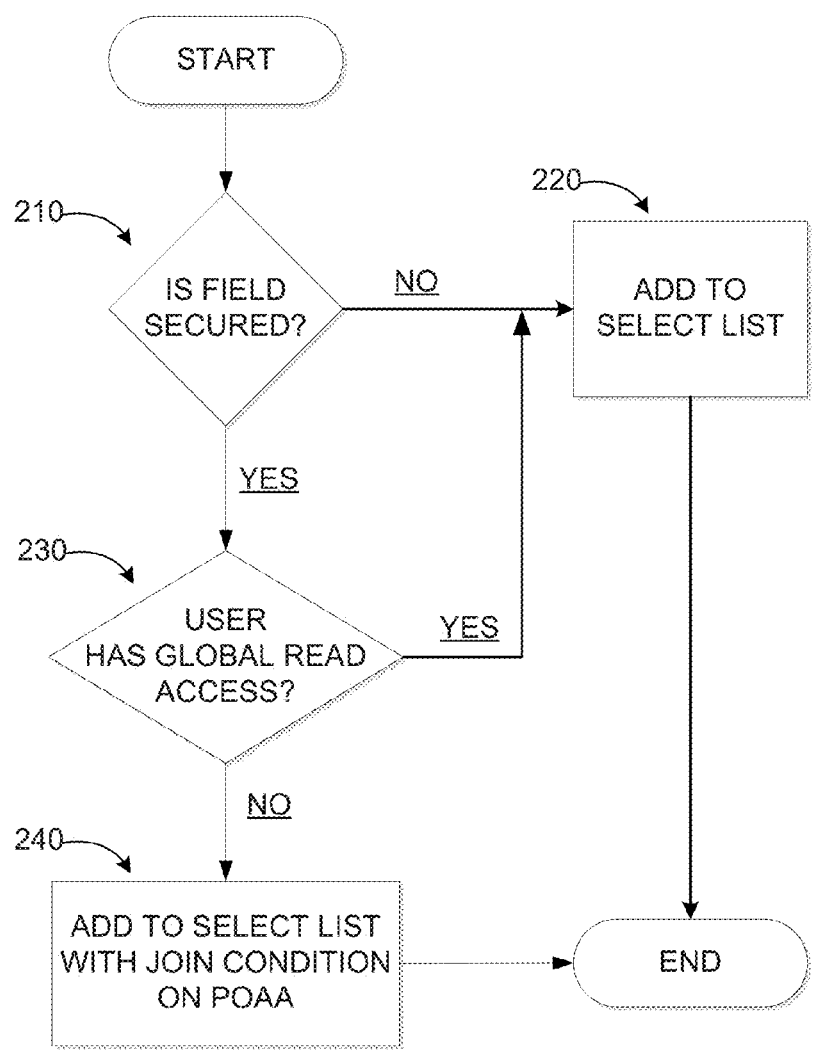
FIG. 2 illustrates example flow diagram enabling user read access to a CRM secured field.

FIG. 2 illustrates example flow diagram enabling user read access to a CRM secured field. A system according to embodiments employs a CRM application enabling access to secured field instances based on a field setting. The field setting may be based on the secured or unsecured status of the CRM record. A CRM application may determine a secured status of the field. According to some embodiments, the application may determine a user's global secured field read access privilege. According to other embodiments, upon determining a user not having global access privilege, the application may enable access to secured fields by using a special entity, Principle Object Attribute Access (POAA).

To grant, modify, and/or revoke access to a secured field instance without global access to secured field a regular Create, Update, and/or Delete application programming interfaces (APIs) may be used on the POAA. A Create API may be used for granting access to a secured field instance. An Update API may be used to modify access to a secured field instance. A Delete API may be used to revoke access from a secured field instance.

The POAA entity may enable the CRM application to determine whether the requesting user has read access in a client application. An example may be by adding a field in select query to select list with a join condition on a POAA table containing granted user access information.

According to some embodiments, fields of a POAA entity table may include a security principal (e.g., user or team), the secured field instance, and shared access rights of Read or Update. Because sharing of field data can only occur on data that actually exist, there may not be a need to support Create sharing of a field. The secured field instance may be defined by a target entity instance identifier, instance type, and attribute identifier. Custom business logic (e.g., plug-ins or workflows) may modify the contents of POAA table using Create, Update, and/or Delete APIs to enact custom field-level security rules for Read or Update APIs on a secured field instance.

Diagram 200 of FIG. 2 illustrates some example steps in enabling user access to CRM fields according to embodiments. In decision node 210, the CRM application may determine whether a requested field is secured. A secured field may contain data protecting access to private information. Private information may be in various forms and may include personal information, credit card numbers, social security numbers (SSN), and comparable ones.

If the field is not a secured field, the CRM application may add a field in select statement to a select list at block 220 to retrieve fields one at a time or in batch. The retrieval may be by a database retrieval method such as a select query or it may be through other methods determined by the field storage mechanism.

If the field is a secured field, such as information requiring privacy, then the CRM application may apply another decision process to determine the field requesting user's global read access status. The application may determine at decision node 230 whether the user has global read access enabling the user to access all instances of the secured field. If the user has global read access then the retrieval may be granted by adding in select statement to a retrieval list same as the above block 220.

Alternatively, if the user does not have global read access, then the CRM application may utilize POAA table to determine the user's read access from the client application at block 240. Determination of user's read access may be through an implementation dependent field retrieve query. An example retrieval query may look like:

```
select account0.Name as name,account0.AccountId as accountid,
  case
    when poaa0.ReadAccess is null then null -- No shared access
```

```
when poaa0.ReadAccess = 1    then account0.SSN -- field is shared
                                                  for read
    else null end as SocialSecurityNumber
    from Account as account0
        left outer join fn_UserSharedAttributeAccess(@CallerId,
@SecuredAttributeId, 1) as poaa0
            on (poaa0.ObjectId = account0.AccountId)
        where (account0.AccountId = @AccountId0)
```

In the above example, according to an embodiment, an account0 table is queried with a conditional statement to determine a user's read access in the client application. A poaa0 table is utilized to access client application's user privilege fields retrieved from the POAA. And, utilizing the granted user access privileges, SSN fields are retrieved and returned by the retrieval query.

Figure 3:
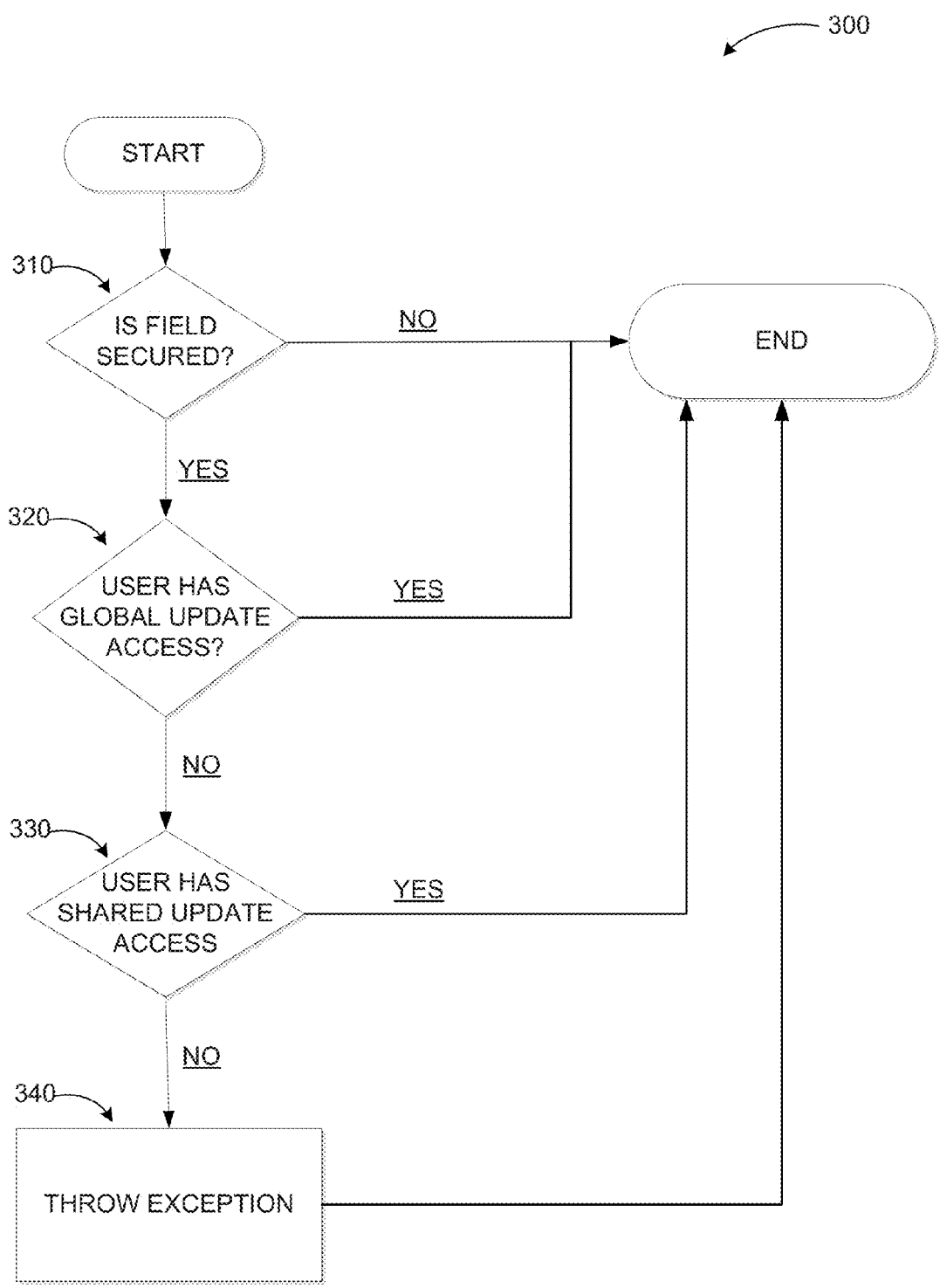
FIG. 3 illustrates an example flow diagram enforcing security of update a secured field instance.

FIG. 3 illustrates an example flow diagram enforcing security of update a secured field instance. As shown in diagram 300, a CRM application may determine a user's write privileges to a secured field instance by determining whether the user has global write privileges. Additionally, the application may determine whether the user may write to secure field without global update access by determining whether the user has shared access through inherited privileges from the client application.

As shown in diagram 300, upon receiving a write request, a CRM application may determine whether a field that a user requested to write or update is secured at decision node 310. Examples of secured fields may include a variety of forms including private information and write restricted data granting update privileges to only select users. If a field is not secured then the requesting user has privileges to write to it.

Alternatively, if a field is secured, the CRM application may determine whether the user has global update access privileges within the CRM application at second decision node 320. The CRM application may determine by matching a requester against and internal user database. If the user has global update rights, then the user may be allowed to update a secured field. Update action may be a write action or a delete action. A global access determination may save resources by allowing the write request and stopping additional user authorization.

Upon determining that a user requesting to update a secured field has no global update access at decision node 320, the CRM application may further determine whether the application may inherit user write privileges from a client application through a granted update access at decision node 330. The determination may be done through POAA to inherit user's write permissions from the client application. The POAA may retrieve user privileges from client applications and inherit the user privileges. An example may be giving a trusted client application (and its users) read and write access to secured fields. Another example may be giving an untrusted client application only read access to secured fields. Above examples are not exclusionary and other methods may be used by a POAA to determine client application user privilege inheritance.

If the user does not have any granted update access then the CRM application may throw an exception at block 340. The thrown exception may be used by the CRM application to deny update access. Alternatively, the exception may be used for a decision to grant limited update access such as read and write access to secured fields.

In another embodiment, the CRM application may group users together and grant read or/and update access to groups of users from the same client or different client applications via the POAA. In other embodiments, the CRM application may run multiple instances of POAA and grant varying shared user privileges depending on instance needs. An example may be running an instance to view text based data only and enabling read access to client application users to view fields containing only textual data. In yet other embodiments, the CRM application may limit shared user privilege based on system resource utilization, timed duration, and/or usage limits.

The systems and implementations of programmatically enabling user access to CRM secured field instances based on field settings discussed above are for illustration purposes and do not constitute a limitation on embodiments. User access to CRM secured field instances may be granted employing other modules, processes, and configurations using the principles discussed herein.

Figure 4:
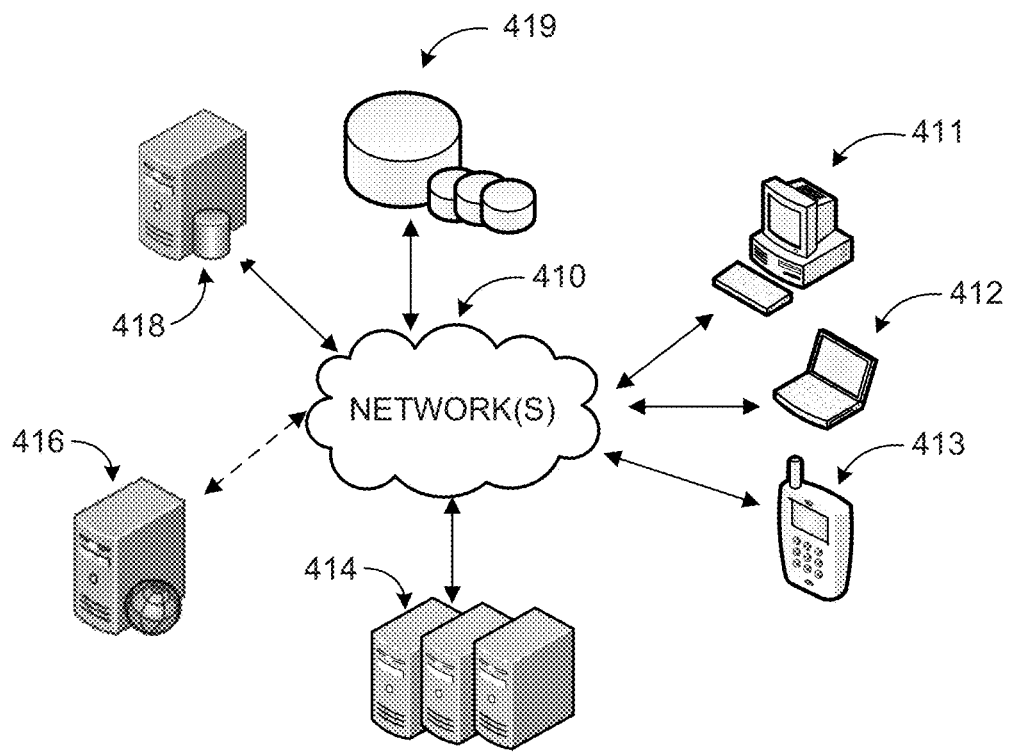
FIG. 4 is a networked environment, where a system according to embodiments may be implemented.

FIG. 4 is an example networked environment, where embodiments may be implemented. Enabling access to CRM application fields may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410.

As discussed above, user access to CRM secured field instances may be enabled programmatically based on field settings. If the user requesting access has granted privilege through a client application, the POAA may inherit the privilege from the client device 411-413. Inheriting the client privilege may give user access to secured fields in the CRM application.

Client devices 411-413 may enable access to applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to enable user access to CRM fields. Furthermore, the networked environments discussed in FIG. 4 are for illustration purposes only. Embodiments are not limited to the example applications, modules, or processes.

Figure 5:
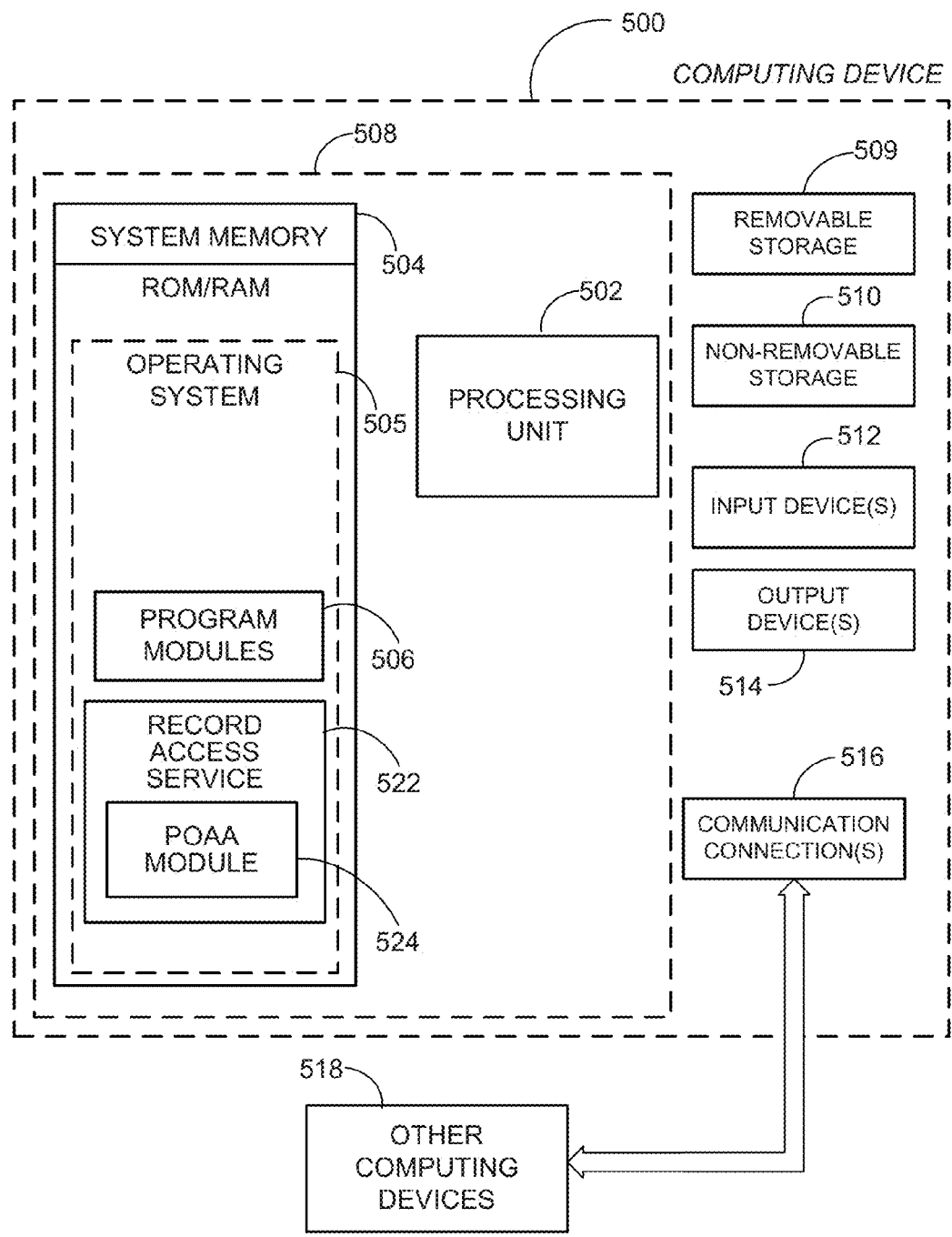
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a CRM application with a POAA to enable user access to its secured fields and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, record access service 522, and POAA module 524.

Record access service 522 may be part of a service that provides secured and unsecured fields to requesting client applications, etc. POAA module 524 may retrieve and inherit user privileges from client application. Inherited client application user privileges may be used to grant access to secured fields. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
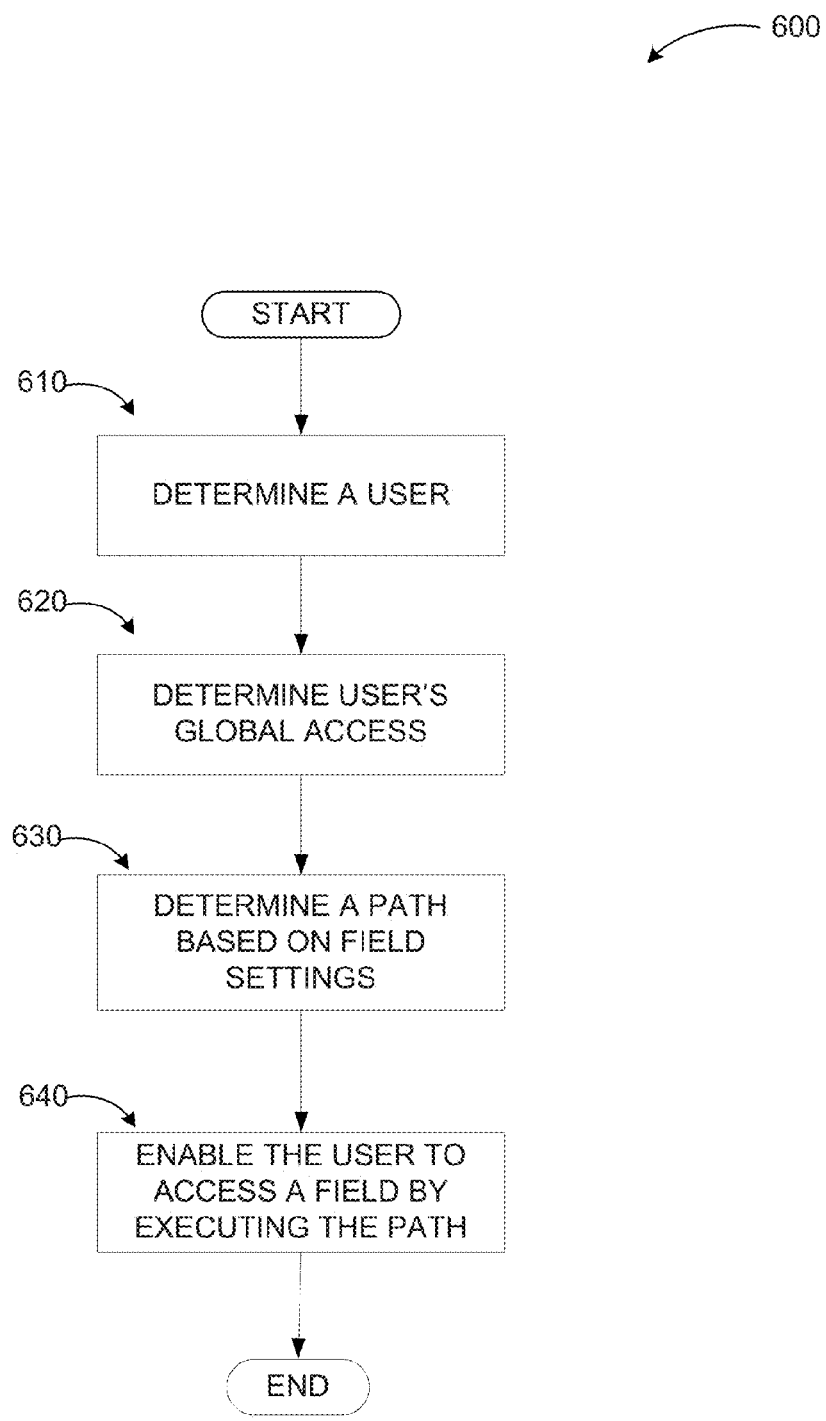
FIG. 6 illustrates a logic flow diagram for a process of enabling a user access to CRM secured field based on an action path according to embodiments.

FIG. 6 illustrates a logic flow diagram for process 600 of enabling a user access to CRM secured field instances based on an action path according to embodiments. Process 600 may be implemented by a server running a CRM application providing secured field instances to clients according to one example implementation.

Process 600 may begin with operation 610, where a CRM application may determine the identity of a user requesting a field. The user identity may be embedded in the request, or alternatively, the CRM application may request the user identification from the client application. The identity may be used to determine a profile of the user, which may define the user's access privileges.

At operation 620, the CRM application may compare the requesting user's identification (profile) against a list of registered CRM application users to determine whether the requesting user has global access to CRM fields. Upon determining the user's global access privileges, the CRM application may choose an action path to execute based on the user's privileges according to field settings at operation 630. The settings may be based on multiple factors, but rely heavily on whether the requested field is secured or not according to some embodiments. Upon determination of the action path, the CRM application may execute the chosen path to enable user access to requested field at operation 640.

The operations included in process 600 are for illustration purposes. Enabling user access to CRM fields according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for enforcing security of an update in a customer relationship management (CRM) field instance, the method comprising:

determining, by a principle object attribute access (POAA) module being executed by a physical CRM server, a profile of a client requesting access to the CRM field instance through a match operation of a client profile to a user database, wherein the user database includes a list of registered CRM application clients;

determining, by a POAA module being executed by a physical CRM server, a secured section of the CRM field instance, wherein the secured section of the CRM field instance is secured with one or more security settings that include a role based security setting to allow an access to an entity type, a record based security setting to allow an access to a record, and a field level security setting to allow an access to a field stored within the CRM field instance;

determining, by a POAA module being executed by a physical CRM server, global write privileges and global update privileges of the client based on the profile and the secured section of the CRM field instance;

selecting an action path based on the one or more security settings of the CRM field instance and the global write privileges and the global update privileges of the client, wherein the action path includes a write operation and an update operation;

executing, by a POAA module being executed by a physical CRM server, the write operation associated with the client into the CRM field instance, wherein the write operation is compliant with the global write privileges of the client;

providing, by a POAA module being executed by a physical CRM server, the client with a revocation privilege to revoke an access operation, another write operation, and another update operation of another client, wherein the revocation privilege is associated with the CRM field instance; and executing, by a POAA module being executed by a physical CRM server, the update operation associated with the client into the CRM field instance, wherein the update operation is compliant with the global update privileges of the client.

2. The method of claim 1, further comprising: executing, by a POAA module being executed by a physical CRM server, another write operation associated with the client into an unsecured section of the CRM field instance, wherein the other write operation is uncompliant with the client's global privileges.

3. The method of claim 1, further comprising: determining, by a POAA module being executed by a physical CRM server, a lack of an initial set of the global write privileges and the global update privileges associated with another client; and utilizing, by a POAA module being executed by a physical CRM server, inherited global write privileges and inherited update privileges from the client.

4. The method of claim 3, further comprising: executing, by a POAA module being executed by a physical CRM server, another write operation associated with the other client into the CRM field instance, wherein the other write operation is compliant with the inherited global write privileges.

5. The method of claim 3, further comprising: executing, by a POAA module being executed by a physical CRM server, another update operation associated with the other client into the CRM field instance, wherein the other update operation is compliant with the inherited global update privileges.

6. The method of claim 1, further comprising: determining, by a POAA module being executed by a physical CRM server, a lack of an initial set of the global write privileges and the global update privileges associated with another client; and prohibiting, by a POAA module being executed by a physical CRM server, the other client from an access operation, another write operation, and another update operation into the CRM field instance.

7. The method of claim 1, further comprising:

determining, by a POAA module being executed by a physical CRM server, a lack of an initial set of the global write privileges and the global update privileges associated with another client;

storing, by a POAA module being executed by a physical CRM server, data of the CRM field instance within a POAA entity;

granting, by a POAA module being executed by a physical CRM server, a shared access for the other client to the data through the POAA entity, wherein the shared access includes a read access and an update access; and retrieving, by a POAA module being executed by a physical CRM server, the data of the CRM field instance from the POAA entity, in response to a request by the other client that is using the shared access.

8. A physical customer relationship management (CRM) server configured to enforce security of an update in a CRM field instance, the physical CRM server comprising:

a memory; and a processor coupled to the memory, the processor executing a principle object attribute access (POAA) module of a CRM application in conjunction with instructions stored in the memory, wherein the POAA module is configured to:

determine a profile of a client requesting access to the CRM field instance;

determine global access privileges of the client by a match of the profile to a user database, wherein the user database includes a list of registered CRM application clients;

determine a secured section of the CRM field instance, wherein the secured section of the CRM field instance is secured with one or more security settings that include a role based security setting to allow an access to an entity type, a record based security setting to allow an access to a record, and a field level security setting to allow an access to a field stored within the CRM field instance;

determine global write privileges and global update privileges of the client based on the profile and the secured section of the CRM field instance;

select an action path based on the one or more security settings of the CRM field instance and the global write privileges and the global update privileges of the client, wherein the action path includes a write operation and an update operation;

execute the write operation associated with the client into the CRM field instance, wherein the write operation is compliant with the global write privileges of the client;

provide, by a POAA module being executed by a physical CRM server, the client with a revocation privilege to revoke an access operation, another write operation, and another update operation of another client, wherein the revocation privilege is associated with the CRM field instance; and execute the update operation associated with the client into the CRM field instance, wherein the update operation is compliant with the global update privileges of the client.

9. The physical CRM server of claim 8, wherein the POAA module is further configured to:

determine a lack of an initial set of the global write privileges and the global update privileges associated with another client; and grant limited global access privileges to the other client to access the CRM field instance.

10. The physical CRM server of claim 9, wherein the POAA module is further configured to:
grant limited global write privileges to the other client to write to the CRM field instance.

11. The physical CRM server of claim 9, wherein the POAA module is further configured to:
grant limited global update privileges to the other client to update the CRM field instance.

12. The physical CRM server of claim 8, wherein the POAA module is further configured to:
store data of the CRM field instance within a POAA entity;
place the client and another client into a group associated with the POAA entity; and
grant a shared access to the data for the group at the POAA entity, wherein the shared access includes a read access and an update access to the data.

13. The physical CRM server of claim 12, wherein the POAA module is further configured to:
retrieve the data from the POAA entity, in response to a request by a member of the group that uses the shared access.

14. The physical CRM server of claim 13, wherein the POAA module is further configured to:
execute another update operation associated with the group into the CRM field instance, wherein the other update operation is compliant with the global update privileges.

15. A method for enforcing security of an update in a customer relationship management (CRM) field instance, the method comprising:
determining, by a principle object attribute access (POAA) module being executed by a physical CRM server, a profile of a client requesting access to the CRM field instance;
determining, by a POAA module being executed by a physical CRM server, global access privileges of the client by a match of the profile to a user database, wherein the user database includes a list of registered CRM application clients;
determining, by a POAA module being executed by a physical CRM server, a secured section of the CRM field instance, wherein the secured section of the CRM field instance is secured with one or more security settings that include a role based security setting to allow an access to an entity type, a record based security setting to allow an access to a record, and a field level security setting to allow an access to a field stored within the CRM field instance;
determining, by a POAA module being executed by a physical CRM server, global write privileges and global update privileges of the client based on the profile and the secured section of the CRM field instance;
selecting an action path based on the one or more security settings of the CRM field instance and the global write privileges and the global update privileges of the client, wherein the action path includes a write operation and an update operation;

executing, by a POAA module being executed by a physical CRM server, a write operation associated with the client into the CRM field instance, wherein the write operation is compliant with the global write privileges of the client;
executing, by a POAA module being executed by a physical CRM server, an update operation associated with the client into the CRM field instance, wherein the update operation is compliant with the global update privileges of the client;
providing, by a POAA module being executed by a physical CRM server, the client with a revocation privilege to revoke an access operation, another write operation, and another update operation of another client, wherein the revocation privilege is associated with the CRM field instance; and
storing, by a POAA module being executed by a physical CRM server, data of the CRM field instance within a POAA entity.

16. The method of claim 15, further comprising:
placing, by a POAA module being executed by a physical CRM server, the client and another client into a group associated with the POAA entity;
granting, by a POAA module being executed by a physical CRM server, a shared access to the data for the group at the POAA entity, wherein the shared access includes a read access and an update access to the data; and
retrieving, by a POAA module being executed by a physical CRM server, the data from the POAA entity, in response to a request by a member of the group that uses the shared access.

17. The method of claim 15, further comprising:
determining, by a POAA module being executed by a physical CRM server, a lack of an initial set of the global write privileges and the global update privileges associated with another client;
granting, by a POAA module being executed by a physical CRM server, limited global access privileges to the other client to access the CRM field instance;
granting, by a POAA module being executed by a physical CRM server, limited global write privileges to the other client to write to the CRM field instance; and
granting, by a POAA module being executed by a physical CRM server, limited global update privileges to the other client to update the CRM field instance.

18. The method of claim 15, further comprising:
providing, by a POAA module being executed by a physical CRM server, the client with a revocation privilege to revoke an access operation associated with another client into the CRM field instance, another write operation associated with the other client into the CRM field instance, and another update operation of another client associated with the other client into the CRM field instance.

* * * * *